United States Patent

Rossi et al.

[15] 3,689,522
[45] Sept. 5, 1972

[54] FLUORINATED ESTERS WITH A PESTICIDE ACTION

[72] Inventors: Giorgio Rossi, Giannantonio Michieli, both of Milan; Paride Paolucci, Rimini, all of Itlay

[73] Assignee: Montecatini Edison S. P. A., Milan, Italy

[22] Filed: Nov. 15, 1968

[21] Appl. No.: 776,274

[30] Foreign Application Priority Data

Nov. 16, 1967 Italy.....................22760 A/67

[52] U.S. Cl............260/469, 260/207.1, 260/471 R, 260/473 R, 260/475 F, 260/476 R, 260/474, 424/226, 424/308, 424/309
[51] Int. Cl.......A01n 9/24, C07c 69/76, C07c 69/78
[58] Field of Search.......................260/469

[56] References Cited

UNITED STATES PATENTS 3,436,418    4/1969    Tonelli et al...............260/469

*Primary Examiner*—Lorraine A. Weinberger
*Assistant Examiner*—R. S. Weissberg
*Attorney*—Curt M. Avery, Arthur E. Wilfond, Herbert L. Lerner and Daniel J. Tick

[57] ABSTRACT

Described are fluorinated aromatic compounds of the formula:

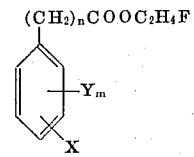

wherein $n = 0$ or $\geq 1$ and $m = 0$, 1 or 2; when $n = 0$, $m = 0$ or 1; when $n = 1$, $m = 0$, 1 or 2; when $N > 1$, $m = 0$; and a. when $n = 0$, $m = 0$, X may be alkyl with a linear or branched chain, alkoxyl, hydroxyl, phenyl optionally substituted, nitro, halo, carboxy-2-fluoroethyl and acyl;
b. when $n = 0$, $m = 1$, X and Y equal or different from each other, may be alkyl with a linear or branched chain, alkoxyl, hydroxyl, phenyl optionally substituted, nitro, halo, acyl;
c. when $n = 1$, $m = 0$, X may be cyclohexyl, phenyl, optionally substituted, benzyl, benzoyl, azophenyl;
d. when $n = 1$, $m = 1$ or 2, X and Y, the same or different from each other, may be nitro or halo;
e. when $n > 1$; $m = 0$, X may be halo, alkoxyl, phenyl optionally substituted.

4 Claims, No Drawings

FLUORINATED ESTERS WITH A PESTICIDE ACTION

U.S. patent application Ser. No. 416,919, filed Dec. 8, 1964 and now U.S. Pat. No. 3,436,418, describes a class of compounds of the formula:

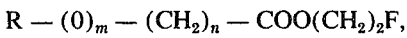

in which $m$ is zero or 1, $n$ is zero or 1 and more precisely, when $n = 1$, R is a phenyl (optionally substituted by a halogen, preferably chlorine, $OCH_3$ and $NO_2$), diphenyl or naphthyl; while when $m = n = 0$, R is a styryl, a mercaptotolyl or diphenylmethyl.

The above compounds are effective against plant pests and more particularly are effective against summer and winter eggs of mites. The effectiveness against the latter is the particular aspect of their range of action as pesticides.

We have now surprisingly found that among numerous other esters of fluoroethyl alcohol, having a pesticide action, there are a few similar ones which are not within the above formula, which are, however, endowed with characteristics particularly suited for practical use. These compounds just form the object of the invention.

An object of this invention are also the compositions which contain said compounds as active principles and their use for the disinfestation of plants from plant parasites. The new compounds fall within the formula:

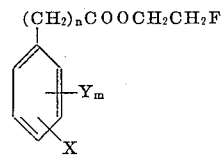

wherein $n = 0$ or $\geq 1$ and $m = 0$, 1 or 2; when $n = 0$, $m = 0$ or 1; when $n = 1$, $m = 0$, 1 or 2; when $n > 1$, $m = 0$; and a. when $n = 0$, $m = 0$, X may be alkyl with a linear or branched chain, alkoxyl, hydroxyl, phenyl optionally substituted, nitro, halo, carboxy-2-fluoroethyl and acyl;

b. when $n = 0$, $m = 1$, X and Y equal or different from each other, may be alkyl with a linear or branched chain, alkoxyl, hydroxyl, phenyl optionally substituted, nitro, halo, acyl;

c. when $n = 1$, $m = 0$, X may be cyclohexyl, phenyl, optionally substituted, benzyl, benzoyl, azophenyl;

d. when $n = 1$, $m = 1$ or 2, X and Y, the same or different from each other, may be nitro or halo;

e. when $n > 1$; $m = 0$, X may be halo, alkoxyl, phenyl optionally substituted.

A further object of this invention is the use of β-fluoroethyl-benzoate against mites and their winter eggs. We have prepared esters of fluoroethyl alcohol with varying structures in which was ascertained a pesticide action, but only those comprised by the above-cited general formula are unforeseeably provided with such kind of characteristics as to suggest that they may be conveniently used for the disinfestation of plants.

Among the esters examined there were:

| | |
|---|---|
| α-phenyl-α-mercapto acetate of β-fluoroethyl | liquid b.p. 97–99°C at 0.2 mm Hg |
| di(β-fluoroethyl)-phthalate | oil b.p. 139–141°C |
| β-fluoroethyl-laurate | oil b.p. 97–99°C at 0.01 mm Hg |
| β-fluoroethyl-phenylsuccinate | liquid b.p. 135–137°C at 0.1 mm Hg |
| α-phenylsulfon-α-phenylacetate | XX from EtOH m.p. 119–119.5°C |
| α-(p-chlorophenylsulfon)-α-phenylacetate of β-fluoroethyl | XX from EtOH m.p. 102.5–103.5°C |
| β-fluoroethyl mesitoate | oil b.p. 81–84°C at 0.1 mm Hg |
| β-fluoroethyl-resinate | liquid b.p. 199–207°C at 0.1 mm Hg |
| β-fluoroethyl α-phenylbutyrate | liquid b.p. 97–98°C at 0.01 mm/Hg |
| β-fluoroethyl β-naphthoxyacetate | waxy solid m.p. 35–39°C $Kp_{0.2} = 146$–148°C |
| β-fluoroethyl-phenoxyacetate | oil b.p. 105–106°C at 0.05 mm Hg |
| β-fluoroethyl-2,4-dichlorophenoxy-acetate | XX from lygroin m.p. 43.4–44.5°C β-fluoroethyl p-acetylaminophenyl-acetate |
| | XX from benzene m.p. 73–75°C |
| β-fluoroethyl p-benzoylaminophenyl-acetate | XX from ethylacetate m.p. 154–157°C |
| β-fluoroethyl nicotinate | liquid b.p. 133–135°C at 15 mm Hg |
| β-fluoroethyl p-methoxyphenylacetate | liquid b.p. 102–103°C at 0.05 mm Hg |
| β-fluoroethyl 2,4-dinitro-phenyl-acetate | XX from MeOH, m.p. 57–58°C |
| β-fluoroethyl-p-methoxybenzoate | liquid b.p. 98–100°C at 0.1 mm Hg |
| β-fluoroethyl p-nitrobenzoate | XX from EtOH, m.p. 59.5–61°C |
| β-fluoroethyl ester of the 2phenanthrylacetic acid | solid, m.p. 50–52°C b.p. 157–160°C at 0.05 mm Hg |
| β-fluoroethyl ester of 3-phenanthrylacetic acid | oil, b.p. 177–180°C at 0.05 mm Hg |
| β-fluoroethyl phenylmercaptoacetate | liquid, b.p. 103–106°C at 0.1 mm Hg |
| β-fluoroethyl phenylsulfonacetate | XX from EtOH, m.p. 43–44°C |
| p-chlorophenylmercaptoacetate of β-fluoroethyl | viscous liquid b.p. 113–115°C at 0.05 mm Hg |
| p-chlorophenylsulfonacetate of β-fluoroethyl | XX from EtOH, m.p. 42–43°C |
| β-naphthylmercaptoacetate of β-fluoroethyl | viscous oil, b.p. 152–154°C at 0.05 mm Hg |
| β-naphthylsulphonacetate of β-fluoroethyl | XX from EtOH, m.p. of 75–76°C |
| α-naphthylmercaptoacetate of β-fluoroethyl | viscous oil, b.p. 144–147°C at 0.05 mm Hg |
| 9-anthranylmercaptoacetate of β-fluoroethyl | XX from ligroin, m.p. 55–56°C |
| α-naphthylsulfonacetate of β-fluoroethyl | viscous oil, b.p. 187–193°C at 0.1 mm Hg |
| p-cyclohexylphenylacetate of β-fluoroethyl | yellow oil, $E_{0.1} = 135$–140°C |
| β-fluoroethyl-tetralylacetate | oil, $E_{0.15} = 121$–123°C |
| β-fluoroethyl ester of α-bromophenylylacetic acid | raw solid, m.p. 63–67°C |
| β-phenylbutyrate of β-fluoroethyl | m.p. 53–54°C and $E_{0.2} = 167$–170°C |
| β-fluoroethyl p-phenylendiacetate | liquid, $E_{0.05} = 90$–92°C |
| β-fluoroethyl 4-ethylphenylacetate | liquid, $E_{0.2} = 96$–98°C |
| β-fluoroethyl β-β-dimethylbutyrate | liquid, $E_{0.1} = 39$–45°C |
| β-fluoroethyl norbornylacetate | liquid, $E_{0.1} = 80$–82°C |
| β-fluoroethyl p-tolylacetate | liquid, $E_{0.2} = 92$–94°C |
| β-fluoroethyl ester of 3,4-dichlorophenylacetic acid | liquid, $E_{0.2} = 108$–112°C |
| β-fluoroethyl p-benzoylphenylacetate | XX from ligroin m.p. 70–72°C |
| β-fluoroethyl p-acetylphenylacetate | liquid, $E_{0.1} = 135$–138°C |

| | |
|---|---|
| β-fluoroethyl m-acetylphenylacetate | liquid, $E_{0.1}$= 130–135°C |
| β-fluoroethyl 4-phenylbenzoate | XX from petroleum ether m.p. 67–68°C |
| β-fluoroethyl 2,4-dinitrophenylacetate | $E_{0.05}$ = 175–180°C |
| β-fluoroethyl p(p-nitrophenoxy) phenylacetate | XX from petroleum ether m.p. 76–78°C |
| β-fluoroethyl 6quinolylacetate | liquid, $E_{0.2}$= 151–153°C |
| β-fluoroethyl p-methylmercaptophenylacetate | XX from hexane m.p. 52.5–54°C |
| β-fluoroethyl p-methylsulfonylphenylacetate | XX from EtOH m.p. 77–70°C |
| β-fluoroethyl ester of p(α-chlorobenzyl) benzoic acid | liquid, $E_{0.15}$=164–166°C |
| β-fluoroethyl p-phenylmercaptophenylacetate | oil, $E_{0.08}$= 160–163°C |
| β-fluoroethyl N-phthaloylaminoacetate | XX from MeOH, m.p. 113–115°C |
| β-fluoroethyl p-benzylphenylacetate | oil, $E_{0.2}$= 152–154°C |
| β-fluoroethyl p-phenylazophenylacetate | XX from hexane, m.p. 74–76°C |
| β-fluoroethyl p(N-benzylidenamine) phenylacetate | liquid, $E_{0.2}$= 167–169°C |
| β-fluoroethyl β-4-diphenylacrylate | XX from ligroin, m.p. 85–87°C |
| β-fluoroethyl β-benzoylpropionate | oil, $E_{0.05}$= 125–126°C |
| β-fluoroethyl β(4-diphenylyl) propanoate | oil, $E_{0.1}$= 150°C |
| β-fluoroethyl ester of undecenoic acid | liquid, $E_{0.1}$= 82–84°C |
| β-fluoroethyl 3(p-phenylbenzoyl) propanoate | XX from MeOH, m.p. 103–105°C |
| β-fluoroethyl 4(4-diphenylyl) butyrate | solid, $E_{0.1}$ = 160–162°C |
| β-fluoroethyl p-xenylglyoxylate | XX from Et₂O, m.p. 75–76°C |
| β-fluoroethyl p-bromophenylacetate | liquid, $E_{0.1}$= 102–104°C |
| β-fluoroethyl benzoate | liquid, $E_{0.2}$ = 61–63°C |
| β-fluoroethyl 2,4,5-trichlorophenylacetate | solid, $E_{0.15}$= 110–115°C |
| β-fluoroethyl p-chlorophenylacetate | liquid, $E_{0.15}$= 92–96°C |
| β-fluoroethyl p-fluorophenylacetate | liquid, $E_{0.1}$= 89–92°C |
| β-fluoroethyl o-nitrobenzoate | liquid, $E_{0.1}$= 117–120°C |
| β-fluoroethyl o-benzoylbenzoate | di XX from ethylacetate/petroleum ether, m.p. = 62–63°C |
| β-fluoroethyl o-chlorobenzoate | liquid, $E_{0.1}$ = 81–84°C |
| β-fluoroethyl 4-tert.-butylbenzoate | liquid, $E_{0.1-0.2}$ = 95–98°C |
| β-fluoroethyl 3-5-dinitrobenzoate | di XX from ethylacetate/petroleum ether m.p. 80–81°C |
| β-fluoroethyl salicylate | liquid, $E_{0.1-0.2}$ = 66–67°C |
| β-fluoroethyl terephthalate | di XX from ethylether/ligroin m.p. 89–90°C |
| β-fluoroethyl p-(p-bromophenyl) phenylacetate | di XX from MeOH m.p. 68–70°C |
| β-fluoroethyl (p-chlorophenyl)butyrrate | oil, $E_{0.2}$ = 127–128°C |
| β-fluoroethyl (p-methoxyphenyl)butyrrate | oil, $E_{0.2}$ = 117–119°C |

In the above table, XX stands for "crystals."

Among the preferred compounds of the invention are the β-fluoroethyl ester of 4-diphenylyl carboxylic acid, the β-fluoroethyl ester of β-(4-diphenylyl) propionic acid, the β-fluoroethyl ester of p-cyclohexylphenylacetic acid, the β-fluoroethyl ester of benzoic acid, the β-fluoroethyl ester of methoxybenzoic acid, the β-fluoroethyl ester of γ(4-diphenyl)butyric acid.

In so far as practical use is concerned, the most relevant characteristic of these compounds, which are also endowed with a pesticide effect, is their effectiveness in destroying the mite eggs, even those eggs belonging to strains resistant to the currently used products.

In order to fully realize the practical importance of the data reported further on, it is necessary that in evaluating the ovicidal (egg-killing) action of a product, one must keep in mind that it is necessary to distinguish whether the product is active against the summer eggs or against the winter eggs. As a matter of fact, it is well known that some mite species hibernate in the state of eggs. These latter are less attackable by pesticidal agents than are the summer eggs, particularly due to the greater obstacle to penetration of the pesticide substance represented by the "corium" of the winter egg. The control of the winter mite eggs offers many advantages. However, in order to achieve good results against this kind of eggs by means of products of common use (e.g.: mineral oils admixed with parathion) it is necessary to act immediately at the resumption of the vegetative activity and with the most timely intervention. This, however, is often hampered by adverse atmospheric conditions while, on the other hand, many phytotoxic effects may be furthermore provoked if the treatment is carried out at an advanced vegetative stage of the plant.

Quite obviously, the treatment in deep winter does not cause such troubles and besides one also avoids injury to numerous species of useful insects (predatory insects and parasites) as well as eliminates the risks connected with the persistence on the plants of the residues of the substances used for the treatments, since often enough these substances show a rather strong toxicity for warm-blooded animals. Furthermore, from a practical point of view, the possibility to carry out the control of mites during the winter, that is, in a period when the workers in the fruit-growing farm are less occupied, represents an undoubted advantage. The treatments in full winter may be carried out with mineral oils, with oils boosted with the admixture thereto of synthetic active substances. This meets negligible success because of the particular, already previously mentioned, resistance of the hibernating eggs.

We have now surprisingly found that the compounds of the present invention are not only effective against the summer eggs of the acari, but are also very active against their winter eggs with treatments carried out in deep winter. Furthermore, they are also quite effective against the other vital stages of the mites and against psyllids, insects which start their egg-laying in winter. Their effectiveness attains such high limits as to ensure a total disinfestation of the parasites and displays, at the same time, a considerable persistence of action. This actually means that said compounds unfold their action for a long time after their spraying onto the plants. The greater persistence of the action of a pesticide agent allows one to reduce the number of treatments and makes the disinfestation safer and more complete. Thus, we have here a characteristic of the greatest importance from the practical point of view.

From what has been stated, it appears quite evident that the chief object of this invention is to provide means particularly effective and useful for the disinfestation of plants from winter eggs of mites and from some insect species, while a secondary object is that of providing means which, with the action against the winter eggs, also combine the activity against the other vital stages of mites so as to form complete overall fighting means against these pests.

The compounds according to this invention can be prepared easily by the esterification of acids of the type:

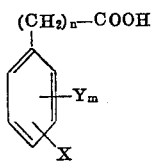

wherein X, Y, n and m have the above-mentioned meaning, with β-fluoroethyl alcohol, by using the means of the prior art. In general, one prefers to esterify in the presence of an acid catalyst and of a solvent, not mixable with water, which forms an azeotropic mixture with the latter to keep the reactants in solution and allow the removal of the water by distillation as it forms during the esterification. Some of the compounds may be prepared by taking advantage of the so-called "-transesterification," that is, by treating an ester of the acid involved with β-fluoroethyl alcohol.

The preparation of compounds and formulations containing as active principles the substances of this invention does not offer any difficulties since they are soluble in many of the commonly used solvents. Depending on the specific use to which they are intended, formulations of different types may be prepared: Powder formulations are prepared by thoroughly mixing the active substance with inert fillers and diluents such as kaolin, talc, attapulgite, sepiolite, diatomaceous earth, artificial silicates, etc.

By thoroughly mixing together the active substance with inert powders (as above) and with a substance or mixture of substances with a surfactant or wetting action, which may be chosen, for instance, from the classes of condensates of ethylene oxide with alkylphenols or with higher aliphatic alcohols or from the class of calcium or sodium alkylbenzene (naphthalene) sulfonates, so-called wettable powders are prepared. That is, formulations are obtained which can be added to water for giving suspensions that are used for disinfestation by spraying.

Liquid formulations emulsifiable in water are prepared by adding to a solution of the active substance in a solvent, insoluble in water, a substance or mixture of substances with a surfactant or wetting action, which may belong to the classes previously listed.

By adding the formulations of this type to water, one obtains emulsions ready for use. Liquid formulations based on mineral oils combined with emulsifying surfacting agents and co-solvents, containing the substance of this invention, are conveniently used, when dispersed in water, for treatment of plants infested by parasites.

The proportions or ratios between the active substance and the other components of the formulations may vary within wide limits. In order to more clearly illustrate this invention, examples for the preparation will be given, provided with data on the pesticidal activity, it being understood that these examples are not to be construed as in any way limiting the protective scope of the invention itself.

The following thus illustrates the technique of the tests on the activity of most of the products. In reporting the data obtained, the possible variants introduced into this technique will be also specified.

In order to carry out the biological activity tests, a formulation was used which was prepared by dissolving 20 parts by weight of the product under examination in 75 parts by weight of xylol, adding to the solution 5 parts of a mixture of equal parts of calcium dodecylbenzosulfonate and of a condensate of ethylene oxide with nonylphenol. Thereupon, the quantity of formulation necessary for obtaining the desired concentration of active substance was admixed to the water under stirring. The emulsions thus obtained were sprayed onto the plants or on those parts of the plants which were infested by parasites.

The tests were carried out on the following mite species: *TETRANYCHUS URTICAE*, strain: *Sambucus* sensitive to the phosphoorganic products, to ovicides and to bis-parachlorodiphenylcarbinols (strain kindly supplied by Dr. W. Helle, of the Laboratorium voor Toegepaste Entomologie van de Universiteit van Amsterdam-Limnaeus Straat 2B); "T 515" (strain kindly supplied by: Dr. W. Helle of the University of Amsterdam, as specified above) which is highly resistant against Tedion, but not to phosphoorganic compounds; *Baardse* (strain kindly supplied by Dr. W. Helle), which is polyresistant, i.e. resistant against phosphoorganic substances, to Tedion and a little to Kelthane; *Panonychus ulmi*, strain resistant to the (R) phosphoorganic compounds; *Eotetranychus carpini vitis* in the adult stage and in the stage of summer eggs; and on some insect species.

In the case of "*Panonychus ulmi*" tests were carried out also on winter eggs. The methods for determining the activity of the pesticides were as follows:

The acaricide (adult mites) activity was established by direct spraying onto discs of leaves infested with 100 female mites and preserved at 24°–26°C on wetted cotton in open Petridishes, and recording the mortality after 24 hours.

The direct ovicidal activity was determined by infesting the leaf-discs with 100 adult females. After 24 hours, the females were removed and the discs with the eggs were sprayed with the aqueous emulsion containing the active substance and were then stored as described above until a few days after the hatching of the untreated control eggs.

The ovicidal activity due to the residual effect was determined by spraying discs made from leaves with the aqueous emulsion of the active substance. After 2 hours, females were transferred onto these leaves and were left to lay eggs on the treated surface of said leaves. After 24 hours the females were removed and the percentage of unhatched eggs was calculated after the hatching of the eggs laid on non-treated discs (control discs).

The assessing or determining of the activity against winter eggs was carried out under natural environment conditions according to the following procedures:

Apple trees in pots, placed under natural environment conditions, strongly and uniformly infested with winter eggs of *Panonychus ulmi* of a FAC-resistant strain, bred in a laboratory, were sprayed before their vegetative awakening February-March). During the hatching period of the eggs, various successive samplings were carried out on the new vegetation, until reaching at the end of the hatching, the complete defoliation of the plants in order to count the number of present larvae. In this way it was possible to calculate the percentage reduction of the infestation on the treated plants in comparison to the control plants. For each repetition one single plant was considered.

The tests of adulticide action persistence were carried out by spray treating small apple trees in pots with aqueous dispersions of the products under examination. These plants were then kept in the open under natural environmental conditions. At different intervals of time after the initial treatment, small discs were drawn from the leaves. These discs were then infested in the laboratory, each with 100 females. The mortality of the latter was then checked after 24 hours.

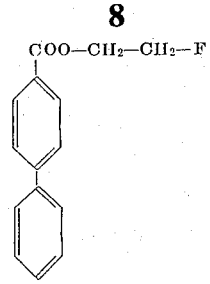

M 2875

|  | Winter eggs, percent | | Summer eggs | | | | Adults | | | |
|---|---|---|---|---|---|---|---|---|---|---|
| Biological activity | | | Direct, percent | | Residual, percent | | Direct, percent | | Residual, percent | |
|  | 0.01 | 0.1 | 0.01 | 0.1 | 0.01 | 0.1 | 0.01 | 0.1 | 0.01 | 0.1 |
| Tetranychus urticae Sambucus | | | 98 | 100 | 100 | 100 | 61 | 100 | 42 | 100 |
| Tetranychus urticae T 515 | | | 100 | 100 | 100 | 100 | 91 | 100 | 18 | 94 |
| Tetranychus urticae Baardse | | | 100 | 100 | 95 | 100 | 72 | 99 | 11 | 97 |
| Panonychus ulmi R | 98.2 | 100 | 95 | 97 | 100 | 100 | 86 | 100 | 76 | 100 |
| Eotetranychus carpini F. vitis | | | 100 | 100 | | | 100 | 100 | 94 | 100 |
| Aphis fabae | | | | | | | 71 | 98 | | |
| Macrosiphum solani | | | | | | | 97 | 100 | | |
| Aspidiotus hoderae | | | | | | | 100 | 100 | | |
|  | | | 0.00025 | 0.0005 | | | | | | |
| Pear Psylla larvae | | | 99.4 | 100 | | | | | | |

EXAMPLE NO. 1

β-fluoroethyl ester of 4-diphenylcarboxylic acid; M 2875

Into a 500 cc flask provided with a stirrer, a thermometer and a Marcusson device for the distillation of water present in the form of an azeotropic mixture, were charged:

150 cc of benzene
23 g of monohydrated p-toluenesulfonic acid.

The mixture was then refluxed until complete elimination of the water. The whole mixture was then cooled down and 11.5 g of β-fluoroethanol
24 g of 4-diphenyl-carboxylic acid were added.

The mixture was then refluxed until the water was removed. The mass was then cooled and water was added. By filtering, part of the non-esterified acid was eliminated (about 11 g). The organic phase was then washed with diluted solution of sodium hydroxide, then with water again and finally was dried on anhydrous CaSO₄ and evaporated under reduced pressure. A residue of 12 g of solid substance was obtained. A sample of this substance, purified by crystallization from petroleum ether, is a white crystalline substance with melting point from 67°-68°C, and is the β-fluoroethyl ester of 4-diphenylcarboxylic acid.

Analysis:
calculated F = 7.78%
found F = 7.45%

EXAMPLE NO. 2 fluoroethyl ester of β-(4-diphenyl)-propionic acid; M 2939

Into a 500 cc flask, provided with a stirrer, a thermometer and a Marcusson device for the distillation of water present in the form of an azeotropic mixture, were charged:

150 cc of benzene
11.6 g of monohydrated p-toluenesulfonic acid.

The whole was then reflux heated until complete elimination of the water. The mass was then cooled down and 7.7 g of β-fluoroethanol and
14 g of β-(4-diphenyl)-propionic acid were added.

The whole mixture was then refluxed until the water was eliminated. The organic phase was, thereupon, washed with a dilute sodium hydroxide solution, then again with water and finally was dried on anhydrous CaSO₄ and evaporated under reduced pressure. Thereby 13.5 g of an oily substance were obtained as a residue. This substance, purified by distillation under reduced pressure ($E_{0.1} = 150°-151°C$), is a colorless liquid which, after a certain period, completely solidifies, and is the fluoroethyl ester of β-(4-diphenyl)-propionic acid.

The analysis showed:
calculated F = 6.98%
found F = 6.62%

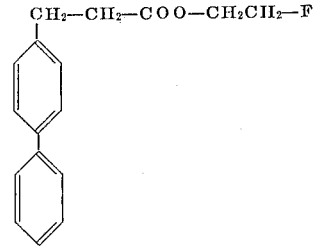

M 2939

|  | Winter eggs, percent | | Summer eggs | | | | Adults | | | |
|---|---|---|---|---|---|---|---|---|---|---|
| Biological activity | | | Direct, percent | | Residual, percent | | Direct, percent | | Residual, percent | |
|  | 0.01 | 0.1 | 0.01 | 0.1 | 0.01 | 0.1 | 0.01 | 0.1 | 0.01 | 0.1 |
| Tetranychus urticae Sambuous | | | 100 | 100 | 98 | 100 | 81 | 100 | 6 | 100 |
| Tetranychus urticae T 515 | | | 100 | 100 | 96 | 100 | 48 | 100 | 8 | 71 |
| Tetranychus urticae Baardse | | | 91 | 100 | 82 | 100 | 31 | 100 | 5 | 50 |
| Panonychus ulmi R | 89.5 | 100 | 92 | 100 | 100 | 100 | 100 | 100 | 81 | 100 |
| Eotetranychus carpini F. vitis | | | 100 | 100 | | | 100 | 100 | 97 | 100 |
| Aphis fabae | | | | | | | 70 | 100 | | |
| Macrosiphum solani | | | | | | | 100 | 100 | | |
| Aspidiotus hedarae | | | | | | | 100 | 100 | | |
|  | | | 0.00025 | 0.0005 | | | | | | |
| Pear Psylla larvae | | | 95 | 98 | | | | | | |

EXAMPLE NO. 3

β-fluoroethyl ester of the p-(p-bromophenyl)phenylacetic acid; M 3060

Into a 500 cc flask, provided with a stirrer, a thermometer and a Marcusson device for the distillation of the water in the form of an azeotropic mixture, were charged:

160 cc of benzene
11.2 g of p-toluenesulfonic acid
19 g of p-(p-bromophenyl)phenylacetic acid
8.4 g of β-fluoroethanol at 95%

The whole was then reflux heated until complete elimination of the water. Thereupon the mixture was washed in an organic solution first with water, then with a 2 percent solution of NaOH and again twice with water. The whole was then dried on anhydrous $CaCl_2$, filtered and evaporated under reduced pressure. As a solid residue there remains 22 g of a greasy brown product. A sample of this substance, purified by crystallization from methanol and recrystallized from the same solvent, is a yellow crystalline substance of melting point 68°–70°C, and constitutes the β-fluoroethyl ester of p-(p-bromophenyl)phenylacetic acid.

| Biological Activity: | Winter eggs | | Summer eggs direct | | Adults direct | |
|---|---|---|---|---|---|---|
| | 0.01% | 0.1% | 0.01% | 0.1% | 0.01% | 0.1% |
| Tetranychus urticae | | | 100 | 100 | 12 | 85 |
| Panonychus ulmi R strain | 89.8 | 99.9 | 61 | 100 | 33 | 100 |

The analysis showed:
calculated F = 5.63%   found F = 5.55%
calculated Br = 23.7%   found Br = 23.16%

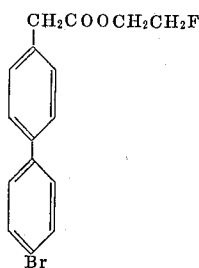

M 3060

EXAMPLE NO. 4

β-fluoroethyl ester of γ-(4-diphenyl)butyric acid; M 2942

Into a 500 cc flask, provided with a stirrer, a thermometer and a Marcusson device for distilling water in the form of an azeotropic mixture, were charged:

200 cc of benzene
25 g of monohydrated p-toluenesulfonic acid.

The mixture was then reflux heated until complete elimination of the water. It was then cooled down and added thereto were:

16.7 g of β-chloroethanol
32 g of γ-(4-diphenyl)butyric acid.

Thereupon, the mixture was refluxed thereby eliminating the reaction water. The whole was then cooled down and water was again added to it. The organic phase was then washed with a diluted solution of sodium hydroxide, again washed with water and finally dried on anhydrous $CaCl_2$ and evaporated under reduced pressure. A residue of 35 g of a semisolid substance was obtained which, when subjected to distillation under reduced pressure ($E_{0.1}$ = 160°–162°C), yielded 29 g of a colorless low melting substance constituting β-fluoroethyl ester of γ-(4-diphenyl)butyric acid.

The analysis showed:
calculated F = 6.64%
found F = 6.66%

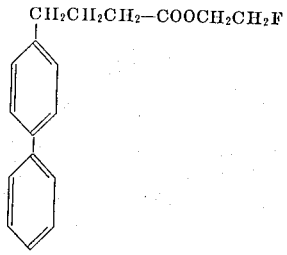

M 2942

| Biological activity | Winter eggs, percent | | Summer eggs | | | | Adults | | | |
|---|---|---|---|---|---|---|---|---|---|---|
| | | | Direct, percent | | Residual, percent | | Direct, percent | | Residual, percent | |
| | 0.01 | 0.1 | 0.01 | 0.1 | 0.01 | 0.1 | 0.01 | 0.1 | 0.01 | 0.1 |
| Tetranychus urticae Sambucus | | | 100 | 100 | 95 | 100 | 73 | 100 | 9 | 47 |
| Tetranychus urticae T 515 | | | 100 | 100 | 100 | 100 | 30 | 100 | 4 | 21 |
| Tetranychus urticae Baardse | | | 100 | 100 | 99 | 100 | 12 | 95 | 3 | 24 |
| Panonychus ulmi R | 93.8 | 98.9 | 58 | 88 | 100 | 100 | 100 | 100 | 27 | 100 |
| Eotetranychus carpini F. vitis | | | 100 | 100 | | | 100 | 100 | 88 | 100 |
| Aphis fabae | | | | | | | 70 | 99 | | |
| Macrosiphum solani | | | | | | | 99.3 | 100 | | |
| Aspidiotus hederae | | | | | | | 78 | 100 | | |
| | | | 0.00025 | 0.0005 | | | | | | |
| Pear Psylla larvae | | | 96 | 99.6 | | | | | | |

EXAMPLE NO. 5

β-fluoroethyl ester of p-cyclohexylphenylacetic acid; M 2769

Into a 250 cc flask provided with a stirrer, a thermometer and a Marcusson device for distilling water in the form of an azeotropic mixture, were charged:

100 cc of benzene
25.5 g of monohydrated p-toluenesulfonic acid.

The mixture was then heated at reflux until complete elimination of the water. The whole was then cooled down and added thereto were:

11.2 g of β-fluoroethanol
29 g of p-cyclohexyl-phenylacetic acid.

The whole was then refluxed thereby eliminating the reaction water. The mixture was then cooled down and water was again added to it. The organic phase was then washed with a diluted solution of sodium bicarbonate, then again with water, thereupon it was dried on anhydrous $CaSO_4$ and finally evaporated under reduced pressure. A residue of 35 g of an oily substance was obtained thereby. A sample of this substance, subjected to distillation under reduced pressure ($E_{0.1-0.2}$ = 135°-140°C) is a colorless oil constituting the β-fluoroethyl ester of p-cyclohexylphenylacetic acid.
Analysis gave:
calculated F = 7.19%
found F = 6.92%

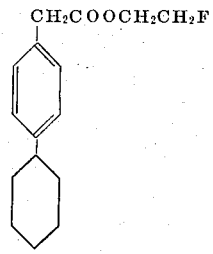

M 2769

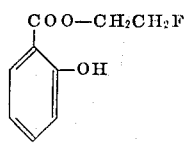

M 3056

EXAMPLE NO. 7

β-fluoroethyl ester of p-methoxybenzoic acid; M 2478

Into a 500 cc flask provided with a stirrer, a thermometer and a Marcusson device for the distillation of water in the form of an azeotropic mixture, were charged:
150 cc of benzene
33.5 g of p-methoxybenzoic acid
37.9 g of p-toluenesulfonic acid
27.5 g of β-fluoroethanol at 90%.

| | Winter eggs, percent | | Summer eggs | | | | Adults | | | |
|---|---|---|---|---|---|---|---|---|---|---|
| | | | Direct, percent | | Residual, percent | | Direct, percent | | Residual, percent | |
| Biological activity | 0.01 | 0.1 | 0.01 | 0.1 | 0.01 | 0.1 | 0.01 | 0.1 | 0.01 | 0.1 |
| Tetranychus urticae Sambucus | | | 100 | 100 | 91 | 100 | 92 | 100 | 11 | 67 |
| Tetranychus urticae T 515 | | | 100 | 100 | 85 | 100 | 67 | 100 | 2 | 25 |
| Tetranychus urticae Baardse | | | 100 | 100 | 59 | 95 | 40 | 100 | 3 | 14 |
| Panonychus ulmi R | | 100 | 87 | 100 | 98 | 100 | 76 | 100 | 50 | 100 |
| Eotetranychus carpini F. vitis | | | 100 | 100 | | | 100 | 100 | 85 | 100 |
| Aphis fabae | | | | | | | 79 | 98 | | |
| Macrosiphum solani | | | | | | | 92 | 100 | | |
| Aspidiotus hederae | | | | | | | 98 | 100 | | |
| | 0.00025 | 0.0005 | | | | | | | | |
| Pear Psylla larvae | 79 | 99 | | | | | | | | |

EXAMPLE NO. 6

β-fluoroethyl ester of salicylic acid; M 3056
Into a 500 cc flask provided with a stirrer, a thermometer and a Marcusson device for distilling water in the form of an azeotropic mixture, were charged:
150 cc of benzene
27.6 g of salicylic acid
34.4 g of p-toluenesulfonic acid
17.8 g of β-fluoroethanol at 95%.
This mixture was refluxed until complete elimination of the reaction water. The whole was then cooled down and water was added thereto. A part of the non-esterified acid (about 15 g) was filtered off. The organic phase was thereupon washed with a dilute solution of sodium carbonate, then again washed with water and finally dried on $CaCl_2$ and evaporated under reduced pressure. 12 g of an oily substance were thereby obtained as a residue. A sample of this substance, subjected to distillation under reduced pressure ($E_{0.1-0.2}$ = 66°–67°C), is a colorless oil consisting of the β-fluoroethyl ester of salicylic acid.

| Biological Activity: | Winter eggs | | Summer eggs direct | | Adults direct | |
|---|---|---|---|---|---|---|
| | 0.01% | 0.1% | 0.01% | 0.1% | 0.01% | 0.1% |
| Tetranychus urticae | | | 51 | 100 | 5 | 98 |
| Panonychus ulmi R strain | 50.8 | 99.4 | 100 | 100 | 57 | 100 |

Analysis gave:
calculated F = 10.31%
found F = 10.11%

The mixture was then refluxed until complete elimination of the reaction water. The whole was then cooled down and water was added to it. Thereupon, part of the non-esterified acid (about 19 g) was eliminated by filtration. The organic phase was then washed with a dilute solution of sodium carbonate, again washed with water, dried on $CaCl_2$ and finally evaporated under reduced pressure. 15 g of an oily substance were obtained as a residue. A sample of this substance, subjected to distillation under reduced pressure ($E_{0.1-0.2}$ = 98°–100°C), is a colorless oil constituting β-fluoroethyl ester of p-methoxybenzoic acid.
Analysis gave:
calculated F = 9.58%
found F = 9.43%

M 2478

| Biological Activity: | Winter eggs | | Summer eggs | | | | Adults | | | |
|---|---|---|---|---|---|---|---|---|---|---|
| | | | direct | | residual | | direct | | residual | |
| | 0.01% | 0.1% | 0.01% | 0.1% | 0.01% | 0.1% | 0.01% | 0.1% | 0.01% | 0.1% |
| Tetranychus urticae Sambucus | | | 97 | 100 | 4 | 98 | 15 | 100 | 3 | 3 |
| Panonychus ulmi R | 85 | 100 | 100 | 100 | 92 | 100 | 88 | 100 | 12 | 60 |

EXAMPLE NO. 8

β-fluoroethyl ester of p-nitrobenzoic acid; M 2479

Into a 500 cc flask provided with a stirrer, a thermometer and a Marcusson device for distilling water in the form of an azeotropic mixture, were charged:
- 150 cc of benzene
- 36.7 g of p-nitrobenzoic acid
- 37.9 g of p-toluenesulfonic acid
- 27.5 g of β-fluoroethanol at 90%.

The mixture was then reflux heated until complete elimination of the reaction water. The whole was then cooled down and water was added to it. The organic phase was washed with a dilute solution of sodium carbonate, then again with water and finally was dried on $CaCl_2$ and evaporated under reduced pressure. A residue of 42 g of a solid substance was obtained. A sample of this substance, purified by crystallization first from ligroin and then from ethanol, is a white crystalline substance with melting point 58.5°–59.5°C, constituting β-fluoroethyl ester of p-nitrobenzoic acid.

Analysis:
- calculated F = 8.91%
- found F = 8.58%

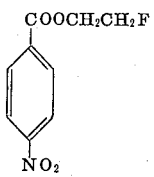

M 2479

| Biological Activity: | Winter eggs | | Summer eggs | | Adults | |
|---|---|---|---|---|---|---|
| | direct | residual | direct | residual | direct | residual |
| | 0.01% | 0.1% 0.01% 0.1% | 0.01% | 0.1% 0.01% 0.1% | 0.01% | 0.1% |
| Tetranychus urticae Sambucus | 100 | 100    35    98 | 17 | 100    3 | | 35 |
| Panonychus ulmi R | 78.8 – | 98.7 100    100 | 80 | 100    80 | 100    18 | 100 |

EXAMPLE NO. 9

β-fluoroethyl ester of 3,5-dinitrobenzoic acid; M 3050

Into a 500 cc flask provided with a stirrer, a thermometer and a Marcusson device for distilling water in the form of an azeotropic mixture, were charged:
- 150 cc of benzene
- 42.4 g of 3,5-dinitrobenzoic acid
- 34.4 g of p-toluenesulfonic acid
- 17.8 g of β-fluoroethanol at 95%.

The whole mixture was then reflux heated until complete elimination of the reaction water. This mass was then cooled down and water added to it. The benzenic phase was, thereupon, washed with a dilute solution of sodium carbonate, then again with water and finally it was dried on $CaCl_2$ and vaporized under reduced pressure. A residue of 49 g of a solid substance was obtained. A sample of this substance, purified by crystallization from ethyl acetate and from petroleum ether, is a white crystalline substance with a melting point between 80° and 81°C, constituting β-fluoroethyl ester of 3,5-dinitrobenzoic acid.

Analysis:
- calculated F = 7.35%
- found F = 7.25%

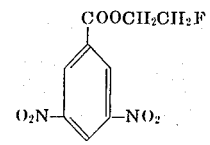

M 3050

| Biological Activity | Winter eggs | Summer eggs direct | Adults direct |
|---|---|---|---|
| | 0.01% 0.1% | 0.01% 0.1% | 0.01% 0.1% |
| Tetranychus urticae Panonychus ulmi R strain | 82.0   85.5 | 100   100   74   100 | 100   100 |

EXAMPLE NO. 10

β-fluoroethyl ester of p-benzylphenylacetic acid; M 2884

Into a 500 cc flask provided with a stirrer, a thermometer and a Marcusson device for distilling water in the form of an azeotropic mixture, were charged:
- 200 cc of benzene
- 22.6 g of p-toluenesulfonic acid
- 27.9 g of p-benzylphenylacetic acid
- 12.8 g of β-fluoroethanol at 95%.

The whole mixture was then refluxed until complete elimination of the reaction water. Thereupon, the mixture was cooled down and was added thereto. The organic phase was then washed with a dilute solution of sodium bicarbonate and then again washed with water, dried on anhydrous $CaSO_4$ and evaporated at reduced pressure. A residue of 34 g of an oily substance was obtained. This substance was then distilled under reduced pressure ($E_{0.2}$=150°–158°C) to give 25 g of a colorless oil, constituting β-fluoroethyl ester of p-benzylphenylacetic acid.

Analysis:
- calculated F = 6.98%
- found F = 6.32%

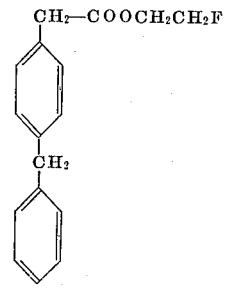

M 2884

| Biological Activity: | Winter eggs | Summer eggs direct | Adults direct |
|---|---|---|---|
| | 0.01% 0.1% | 0.01% 0.1% | 0.01% 0.1% |
| Tetranychus urticae Sambucus | | 97   100 | 97   100 |
| Panonychus ulmi R | 5.4   99.8 | 89   97 | 100   100 |

EXAMPLE NO. 11

β-fluoroethyl ester of 4-tert-butylbenzoic acid; M 3053

Into a 500 cc flask provided with a stirrer, a thermometer and a Marcusson device for distillation of water in the form of an azeotropic mixture were charged:
- 150 cc of benzene
- 35.6 g of p-terbutylbenzoic acid
- 34.4 g of p-toluenesulfonic acid
- 17.8 g of β-fluoroethanol at 95%.

This mixture was refluxed until complete elimination of the reaction water. Thereupon the whole was cooled down and new water was added thereto. The organic phase was then washed with a dilute solution of sodium carbonate, then again with water and finally was dried on $CaCl_2$ and evaporated under reduced pressure. 44 g of a semisolid oily substance was obtained as a residue. By filtration the solid part, constituting about 5 g of non-esterified acid, was then removed. A sample of this substance, subjected to distillation under reduced pressure ($E_{0.1-0.2} = 95°-98°C$), is a colorless oil constituting the β-fluoroethyl ester of 4-tert-butylbenzoic acid.

Analysis:
  calculated F = 8.47%
  found F = 8.20%

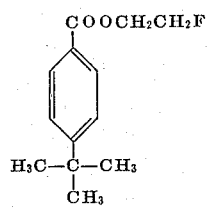

M 3053

| Biological Activity: | Winter eggs | | Summer eggs direct | | Adults direct | |
|---|---|---|---|---|---|---|
| | 0.01% | 0.1% | 0.01% | 0.1% | 0.01% | 0.1% |
| Tetranychus urticae | | | 100 | 100 | 45 | 100 |
| Panonychus ulmi R | 90.3 | 98.1 | 100 | 100 | 100 | 100 |

EXAMPLE NO. 12

β-fluoroethyl ester of p-phenylazophenylacetic acid; M 2921

Into a 500 cc flask provided with a stirrer, a thermometer and a Marcusson device for distilling water in the form of an azeotropic mixture, were charged:
- 200 cc of benzene
- 20.2 g of p-toluenesulfonic acid
- 30 g of p-phenylazophenylacetic acid
- 11.5 g of β-fluoroethanol at 95%.

This mixture was then refluxed until complete elimination of the reaction water. The whole was then cooled down and the benzenic phase was separated from a pitchy clot that had formed during the reaction. Thereupon the organic solution was washed with water, then with a dilute solution of sodium bicarbonate and finally again with water. The mixture was then dried on anhydrous $CaSO_4$ and evaporated under reduced pressure. 19 g of a solid substance remained as a residue. A sample of this substance was extracted with n-hexane at 60°C. The orange-red crystalline substance obtained had a melting point of from 74°–76°C, constituting β-fluoroethyl ester of p-phenylazophenylacetic acid.

Analysis:
  calculated F = 6.64%
  found F = 6.37%

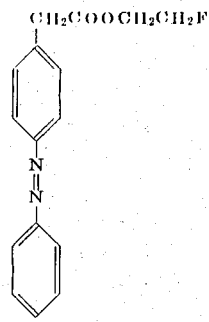

M 2921

| Biological Activity: | Winter eggs | | Summer eggs direct | | Adults direct | |
|---|---|---|---|---|---|---|
| | 0.01% | 0.1% | 0.01% | 0.1% | 0.01% | 0.1% |
| Tetranychus urticae Sambucus | | | 88 | 92 | 8 | 91 |
| Panonychus ulmi R | 65.7 | 97.7 | 58 | 93 | 37 | 98 |

EXAMPLE NO. 13

β-fluoroethyl ester of p-chlorobenzoic acid; M 3051

Into a 500 cc flask provided with a stirrer, a thermometer and a Marcusson device for distilling water in the form of an azeotropic mixture, were charged:
- 100 cc of benzene
- 23.5 g of p-chlorobenzoic acid
- 25.8 g of p-toluenesulfonic acid
- 15.1 g of β-fluoroethanol at 95%.

The mixture was then refluxed until complete elimination of the reaction water. The whole was then cooled down and water was again added to it. Thereupon part of the non-esterified acid (about 5 g) was removed by filtration. The organic phase was then washed with a dilute solution of sodium carbonate, again with water and finally dried on $CaCl_2$ and evaporated under reduced pressure. A residue of 22 g of an oily substance was obtained. A sample of this oily substance, subjected to distillation under reduced pressure ($E_{0.1} = 81°-83°C$) yields a colorless oil constituting β-fluoroethyl ester of p-chlorobenzoic acid.

Analysis:
  calculated F = 9.37%
  found F = 9.10%

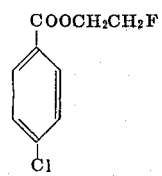

M 3051

| Biological Activity: | Winter eggs 0.01% 0.1% | Summer eggs direct 0.01% 0.1% | Adults direct 0.01% 0.1% |
|---|---|---|---|
| Tetranychus urticae | | 100 100 | 49 100 |
| Panonychus ulmi R | 68.1 99.8 | 100 100 | 100 100 |

EXAMPLE NO. 14

β-fluoroethyl ester of benzoic acid; M 2856

Into a 500 cc flask provided with a stirrer, a thermometer and a Marcusson device for distilling water in the form of an azeotropic mixture, were charged:
 120 cc of benzene
 34.4 g of p-toluenesulfonic acid
 24.4 g of benzoic acid
 17.5 g of β-fluoroethanol at 95%.

The whole mixture was then reflux heated until complete elimination of the reaction water. The mixture was then cooled down and water was added to it. The organic phase was then washed with a dilute solution of sodium carbonate, then again with water and finally was dried on anhydrous $CaCl_2$ and evaporated under reduced pressure. 29.5 g of a liquid substance were obtained as a residue. The mixture was then subjected to distillation under reduced pressure ($E_{0.2} = 61°–63°C$) whereby 21 g of a colorless liquid were obtained, constituting the β-fluoroethyl ester of benzoic acid.

Analysis:
 calculated F = 11.29%
 found F = 10.98%

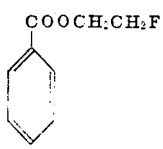

M 2856

| Biological Activity: | Winter eggs (*) 0.01% 0.1% | Summer eggs direct 0.01% 0.1% | Adults direct 0.01% 0.1% |
|---|---|---|---|
| Tetranychus urticae Sambucus | | 99 100 | 3 100 |
| Panonychus ulmi R | 100 100 | 97 100 | 28 100 |

(*) The activity test was carried out according to the already described technique of operating in the laboratory on detached twigs of an apple tree.

EXAMPLE NO. 15

β-fluoroethylester of terephthalic acid: M 3051

60 g of methylester of terephthalic acid and 115.2 g of fluoroethanol were mixed together with 2 g of p-toluenesulfonic acid in 500 cc flask provided with a filled-type rectifying column. The column was provided with a device for refluxing and with a distilling cooler. The reaction mixture was heated gradually to reach boiling point at room pressure and the methanol was then made to distill, keeping an adequate reflux, as the methanol forms in the course of the reaction. The reflux rate was regulated in relation to the temperature of the column top. Once the methanol fraction had been removed, the excess fluoromethanol was distilled under reduced pressure, thereby obtaining a residue constituting 75 g of solid substance. A sample, purified by crystallization from ethanol and subsequently from ligroin, gives a colorless crystalline substance with a melting point of from 89° to 90°C, constituting β-fluoroethylester of terephthalic acid.

Analysis:
 calculated F = 14.71%
 found F = 14.28%

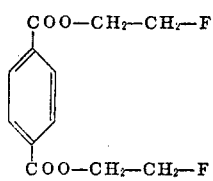

M 3051

| Biological Activity: | Winter eggs 0.01% 0.1% | Summer eggs direct 0.01% 0.1% | Adults direct 0.01% 0.1% |
|---|---|---|---|
| Tetranychus urticae | | 100 100 | 80 100 |
| Panonychus ulmi R | 98.3 99.5 | 100 100 | 100 100 |

EXAMPLE NO. 16

β-fluoroethyl ester of 2,4,5-trichlorophenylacetic acid; M 2957

24 g of 2,4,5-trichlorophenylacetic acid in 150 cc benzene were esterified with 8.3 g of fluoroethanol in the presence of 19 g of p.toluenesulfonic acid through the azeotropic removal of the reaction water. After cooling down, the reaction mixture was poured into water. The organic phase that separated was then washed with a dilute solution of sodium hydroxide and then with water. After drying on anhydrous $CaSO_4$, the solvent was evaporated off under reduced pressure. 19 g of liquid substance were obtained as a residue. A sample, purified by distillation under reduced pressure ($E_{0.15} = 110°–115°C$) constitutes a colorless, low-melting substance of β-fluoroethyl ester of 2,4,5-trichlorophenylacetic acid.

Analysis:
 calculated F = 6.66%
 found F = 6.62%

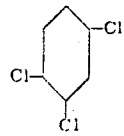

M 2957

| Biological Activity | Winter eggs 0.01% 0.1% | Summer eggs direct 0.01% 0.1% | Adults direct 0.01% 0.1% |
|---|---|---|---|
| Tetranychus urticae | | 100 100 | 89 100 |
| Panonychus ulmi R | 100 100 | 96 98 | 100 100 |

We claim:
1. The compound having the formula:
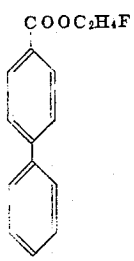
2. The compound having the formula:
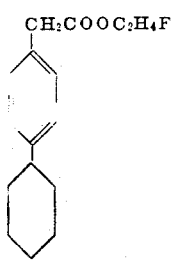
3. The compound having the formula:
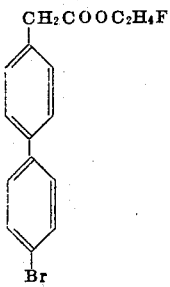
4. The compound having the formula:
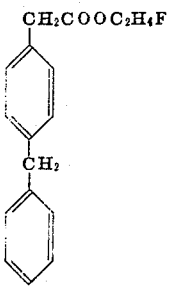
* * * * *